A. S. KROTZ.
PLANTING MACHINE MARKER.
APPLICATION FILED OCT. 14, 1918.
1,306,152.
Patented June 10, 1919.
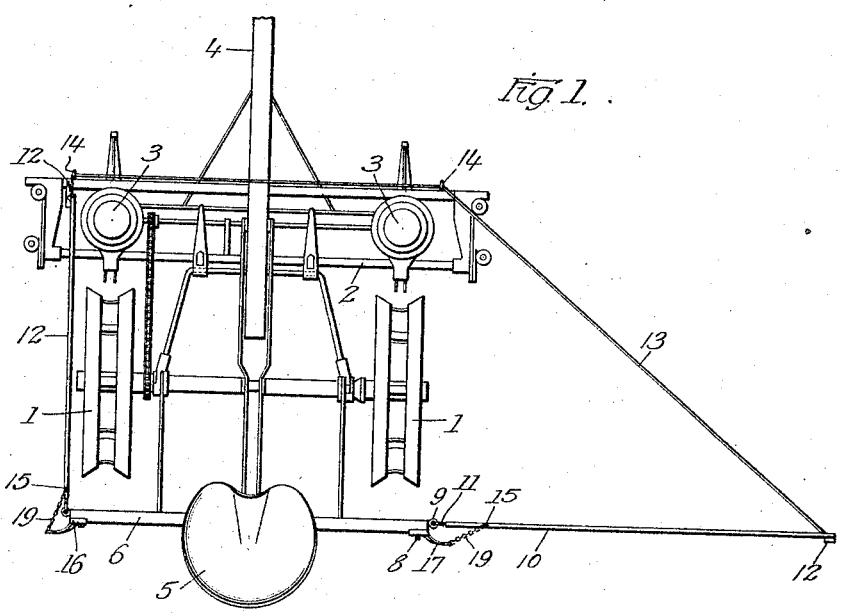
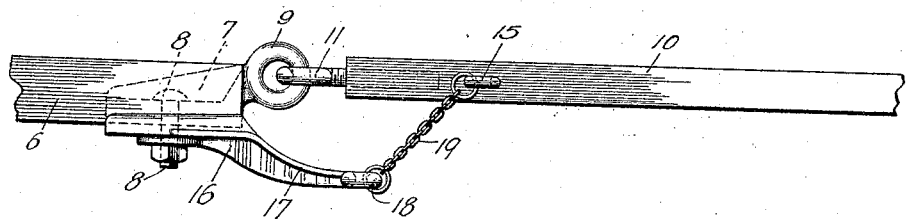
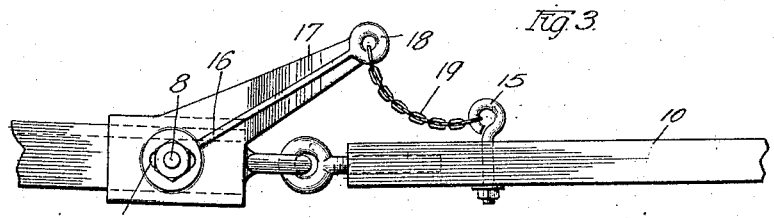
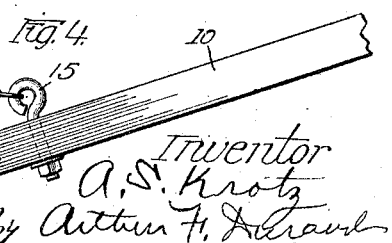

UNITED STATES PATENT OFFICE.

ALVARO S. KROTZ, OF JANESVILLE, WISCONSIN, ASSIGNOR TO JANESVILLE MACHINE COMPANY, OF JANESVILLE, WISCONSIN, A CORPORATION OF WISCONSIN.

PLANTING-MACHINE MARKER.

1,306,152. Specification of Letters Patent. Patented June 10, 1919.

Application filed October 14, 1918. Serial No. 257,969.

*To all whom it may concern:*

Be it known that I, ALVARO S. KROTZ, a citizen of the United States of America, and resident of Janesville, Wisconsin, have invented a certain new and useful Improvement in Planting-Machine Markers, of which the following is a specification.

This invention relates to planting machines in general, but more particularly to those for planting corn, and especially to those in which the seed boxes are mounted in front of the two wheels which support the body frame, so that two rows are planted at the same time.

Generally stated, the object of the invention is to provide a novel and improved automatic marker for use in conjunction with a planting machine of this kind, having means for making a mark on the ground at either side of the machine, parallel with the direction of travel thereof, so that when planting things will be uniformly spaced apart, and having improved means for causing the marker at either side, which is mounted on a swinging arm, to automatically rise as the arm swings toward the planting machine, and while the other arm and its marker swing outward into the position necessary for the use or operation thereof.

It is also an object to provide certain details and features of construction tending to increase the general efficiency and the desirability of an automatic marker of this particular construction and mode of operation.

To these and other useful ends the invention consists in matters hereinafter set forth and claimed:

In the accompanying drawings—

Figure 1 is a plan of a planting machine equipped with an automatic marking arrangement embodying the principles of the invention.

Fig. 2 is an enlarged fragmentary plan view of the connection between one of the marker arms and the body of the machine, showing the arm in extended or operative position.

Fig. 3 is a rear elevation of the parts and structure shown in Fig. 2.

Fig. 4 is a side elevation of these same parts, but showing the marker arm swung around into its inoperative position, thereby to illustrate the manner in which the arm automatically rises while at the same time moving toward the planter.

As thus illustrated, the planting machine may be of the kind ordinarily known as a check-row planter, comprising a pair of wheels 1—1 of the usual and well known character, to support the frame 2, upon the forward portion of which are mounted the seed boxes 3 containing the usual or any suitable seed-dropping mechanism. The frame has a tongue 4 arranged as usual, and the machine is provided at its rear end with a seat 5 for the driver. This is all common and well known, and requires no further explanation.

The rear of the machine is provided with a supplemental frame 6, of any suitable character, to form a support for the automatic marking arrangement. The means for performing the marking operation comprise a bracket 7 secured by a bolt 8 to the end of the frame 6, and a similar bracket and bolt at the other end, each bracket having an eye 9, whereby this provision is made at opposite sides of the planter. The marker arms 10 are provided with eyes 11 which engage the eyes 9, whereby these marker arms are free to swing in any direction about their connections with the planter. A marker 12, of any suitable character, is adjustably secured to each marker arm 10, and the two arms are connected together at their outer ends by a cord or other flexible connection 13 which extends through eyes 14 on the forward portion of the body frame, whereby when one arm is swung outward, it will draw the other arm toward the machine. When the machine turns around at the end of the field, the marker arm which has been in operation is automatically swung around toward the planter, by the turning around of the machine, and the other arm automatically swings outward into position at the other side of the planter.

This operation of the arms is brought about by the provision of supporting means for each arm, of such character that each arm rises while at the same time moving toward the planter, and whereby either arm when thus swung around and raised into its inoperative position has a constant tendency to of its own accord swing outward and downward by gravity. For this purpose, therefore, each arm is provided with an eye-bolt 15, and each end of the frame 6 is provided with a bracket 16 held in place by the bolt 8, said bracket having an outwardly extending arm 17 provided with an eye 18 which is connected by a chain 19 with said eye-bolt 15 on the arm. The eye 18, in each case, it will be seen, is not only above the plane of the eye 9, but is also disposed outside of the latter, the arms 17 extending upwardly as well as laterally from the rear end of the planter. Therefore, when either arm 10 is swung around toward the planter, the chain 19 thereof serves to pull the arm forward, so that the marker on the arm is raised some distance from the ground. In this way, when either arm is in the position shown in Fig. 4, which is the position of the arm shown at the left in Fig. 1, the chain 19 supports the weight of the arm in such a manner that the arm tends constantly to swing outward and downward, but is restrained from so doing by the cord or flexible connection 13 previously described. However, as soon as the planter turns around at the end of the field, so that the extended arm is automatically swung toward the planter, the arm which occupied the raised or inoperative position is then free to swing downward and outward and into position for use. Thus the two marker arms alternate with each other in the marking of the ground, one being in use while the machine is traveling in one direction, and the other one being in use while the machine is traveling in the opposite direction. When the machine is turning around at the end of the field, it is then driven back in the opposite direction along the line or mark made by the marker, and at the same time a mark or line is being made for the machine to follow when it is again turned around and driven back across the field in the opposite direction.

Each bracket 16 has a slot 20 for the bolt 8, and is shaped to slide back and forth on the frame 6 so that it may be held in different positions, thereby to regulate the action of the chains 19 to cause the marker arms to rise either more or less while being swung around toward the planter. Either marker arm, when allowed to swing downward and outward by gravity, will finally rest upon the ground, of course, in operative position, as shown at the right in Fig. 1, and at such time its supporting chain 19 will hang slack or loose, whereby the marker arm may then rise and fall freely as it travels forward over the ground. Of course, when either arm swings outward, its marker will reach the ground before the arm has entirely swung around to a position at right angles to the direction of travel. In other words, the marker reaches the ground very soon, and the forward motion of the machine then causes the arm to swing backward until it is at right angles to the direction of travel, as shown in Fig. 1 of the drawings. While the bolts 8 and the slots 20 are shown as a provision for adjusting or regulating the lifting action of the chains 19, it will be readily understood that any suitable means can be employed for this purpose.

In use, as is well known, the marker makes a straight line which forms the center line of travel when the machine is turned around to return across the field. In other words, the machine is always driven so that the tongue 4 is directly over the line made by the marker, and in this way the rows of corn or other things will be a uniform distance apart, which is the distance between the wheels 1 of the machine. Of course, though, and by adjustment of the marker on its arm, the distance between the rows of corn can be varied, and for such purpose the machine can be driven in different ways relatively to the line made by the marker.

What I claim as my invention is:

1. In a planting machine, a pair of swinging arms disposed at opposite sides of the machine, a marker on the end of each arm, a swinging support for each arm, adapted and arranged to raise the arms when the markers are swung toward the machine, so that each arm will swing outward by gravity, and a connection between said arms, coöperating with said supports to automatically cause either arm to swing outward when the other is swung toward the machine.

2. A structure as specified in claim 1, said supports being attached to the machine at points which are higher than the adjacent hinged ends of said arms, and which are farther apart than said hinged ends, and said supports being attached to their allotted arms at a point between the ends of each arm.

3. A structure as specified in claim 1, said swinging supports consisting of chains hinged at one end to the machine and at the other end to the arms, so that each arm when in use may move freely up and down.

4. In a planting machine, a pair of oppositely arranged marker arms, means to hinge the arms on the machine, swinging supports for said arms, adapted and arranged to cause the arms to rise when swung toward the machine, and a connection between said arms.

5. A structure as specified in claim 4, each support engaging its allotted arm a distance from the hinged end thereof.

6. A structure as specified in claim 4, and means whereby said supports are adjustable to vary the lifting action thereof, so that said arms may have either more or less upward movement when swung toward the machine.

7. A structure as specified in claim 4, said supports comprising a flexible connection for each arm, a bracket for each flexible connection, means to attach the flexible connections to the arms, and devices to attach the brackets to the machine.

8. A structure as specified in claims 4 and 7, said devices affording adjustment of said brackets to regulate the flexible connections to vary the lifting action thereof.

9. A structure as specified in claim 1, and means to regulate said supports to vary the lifting action thereof.

10. In a planting machine, the combination of a pair of swinging arms disposed at opposite sides of the machine, a marker on the end of each arm, a hinge-like support on the machine for each arm, a bracket adjustably secured to the machine adjacent each hinge-like support, each bracket extending outwardly and upwardly in rear of the adjacent swinging arm, a swinging connection between each arm and its allotted bracket, adapted to raise the marker when the arm is swung toward the machine, and a flexible connection between the two arms, so that either arm is raised when the other arm swings outward.

ALVARO S. KROTZ.

Copies of this patent may be obtained for five cents each, by addressing the "Commissioner of Patents, Washington, D. C."